Oct. 13, 1925.

T. C. MOORSHEAD 1,557,078

GLASS MELTING FURNACE

Filed Oct. 15, 1924

Inventor
Thomas Courtney Moorshead
By Pennie, Davis, Marvin [illegible]
Attorneys Patented Oct. 13, 1925.

1,557,078

UNITED STATES PATENT OFFICE.

THOMAS COURTNEY MOORSHEAD, OF STRAND, LONDON, ENGLAND, ASSIGNOR OF ONE-HALF TO THE UNITED GLASS BOTTLE MANUFACTURERS LIMITED, OF STRAND, LONDON, ENGLAND, A BRITISH COMPANY.

GLASS-MELTING FURNACE.

Application filed October 15, 1924. Serial No. 743,684.

*To all whom it may concern:*

Be it known that I, THOMAS COURTNEY MOORSHEAD, a citizen of the United States of America, residing at 40/43 Norfolk Street, Strand, in the county of London, England, have invented certain new and useful Improvements in or Relating to Glass-Melting Furnaces, of which the following is a specification.

This invention relates to glass melting furnaces, and more particularly to so-called continuous tank furnaces.

Continuous tank furnaces as at present constructed are usually constituted by a rectangular compartment divided into two sections by a bridge wall, the sections being termed the melting or reducing compartment and the working compartment, respectively. The bridge wall is usually provided with an opening or "dog-hole" leading to the working compartment, the dog-hole being located below the level of the top surface of the molten glass so as to allow only the melted portion thereof to move forward into the working compartment.

Although tank furnaces are of simple construction and melt the glass economically, the metal produced is not of such good quality as pot metal. This is attributable in large measure, to the fact that in the melting compartment, the glass, as soon as it is melted, does not flow freely into the working or refining chamber, but owing to the unscientific construction of the melting compartment, dormant glass collects in masses, principally in the corners thereof and especially when the furnace is not working at full capacity, and this dormant glass stays in the melting compartment for a more or less prolonged period of time so that it is overheated. When, therefore, such dormant masses of glass are finally carried over into the working compartment they vitiate the character and reduce the quality of the rest of the glass which has been heated and fined for the proper period of time, and the chief object of the present invention is to improve the construction of the furnace in such manner that finer and clearer glass is produced which is of more uniform quality than heretofore.

According to one feature of the present invention the sides of the bridge wall which separate the working from the melting compartments are inclined or curved relatively to both the melting and working compartments, so as to avoid right angled corners in the working and melting compartments in which dormant glass can collect. The other boundary walls of the working and melting compartments, or either of these compartments, may also be so shaped as to form in conjunction with the inclined or curved sides of the bridge wall a compartment or compartments of oval, ovoid, elongated, or substantially hexagonal, octagonal, diamond or like configuration. The most satisfactory configuration for the walls of the melting compartment is substantially torpedo shaped, as this configuration, in conjunction with the inclined or curved sides of the bridge wall not only avoids angled corners in which dormant glass can collect but also presents a streamline outline to the molten glass, which does not impede its free passage from the melting to the working chamber; however, by adopting any of the other shapes indicated, in which right-angled corners are also avoided, improved results over the ordinary tank furnace are obtained. In certain cases, and instead of also providing the working compartment with inclined or curved walls, only the end of the furnace through which the batch mixture is filled, need be curved or formed with inclined sides, together also with the corners at the junction between the bridge wall and the sides of the melting compartment.

According to another feature of the present invention and instead of using a bridge wall which extends entirely across the furnace and which is formed with a dog-hole below the level of the molten glass, the bridge wall may be formed in two parts or sections, inclined relatively to the melting and/or working compartments, said wall sections projecting laterally from opposite sides of the furnace, so as to leave a gap of suitable width at or about the centre of the tank. This gap is closed at its upper part by a floating cylinder or ring which is partially submerged so that the upper end thereof projects above the level of the glass and keeps back all unmolten metal, while the molten portion, free from bubbles and raw material, can pass through the space which is left between the base of the floating ring and the bottom of the tank.

The floating ring may be formed from pot clay, and when, after continued use, it is so far melted away as to impair its efficiency it can readily be removed and a new ring floated into place.

In the preferred construction, each half of the bridge is hollow and is formed by two inclined or V-shaped walls which, if desired, may be roofed over. Owing to this arrangement an ample space is left between the double sides of each half of the bridge wall, thus allowing effective air, water or other cooling to be resorted to. The inclined bridge walls also eliminate right-angled corners at the rear end of the working compartment, but, if desired, additional blocks with inclined sides can be inserted at the two front corners of the working compartment adjacent to the discharge or gathering holes.

The tank may be crowned or arched over in the usual manner, but in order to eliminate the usual charging opening at the front end of the furnace the refractory material around which, as aforesaid, is liable to be melted away owing to the action of the alkalies in the freshly admitted batch, the inclined or curved end of the improved melting compartment may project beyond the front arch so as to expose a narrow section at the rear end of the melting compartment into which the scrap glass or batch mixture can be fed.

The tank is provided with port holes and may be heated in any usual manner, e. g., oil or gas or any other suitable fuel. The port holes at the front and rear end of the melting compartment may if desired be provided with inclined sides or otherwise formed so as to direct the products of combustion towards the centre of the melting tank, thus adapting them to the new shape or configuration thereof.

In order that the said invention may be clearly understood and readily carried into effect the same will now be described more fully with reference to the accompanying drawing which shows by way of example a glass melting tank furnace constructed according to one form of the present invention and in which:—

Figure 1:
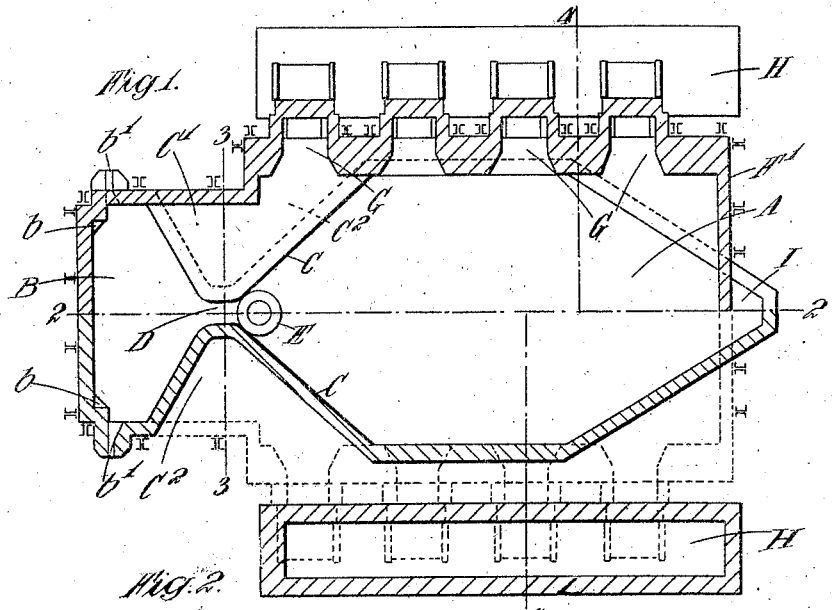
Figure 1 is a sectional plan view of the tank furnace, the section being taken on the line 1—1 of Figure 4.
Figure 2:
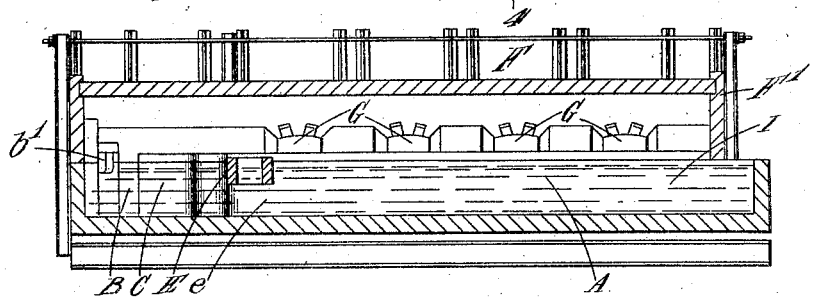
Figure 2 is a longitudinal section taken on the line 2—2 of Figure 1.
Figure 3:
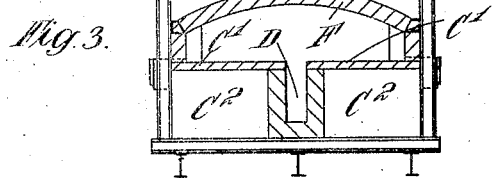
Figure 4:
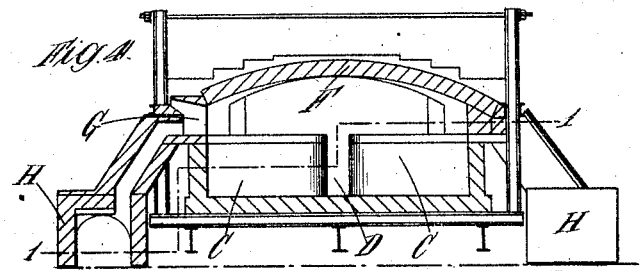

Figures 3 and 4 are transverse sections taken on the line 3—3 and 4—4 of Figure 1, respectively.

A is the melting compartment which in the example shown is of substantially octagonal configuration, and B is the refining or working compartment. C, C are the two sections of the hollow bridge wall, the double walls of each section being inclined relatively to the melting and working compartments and being roofed over at $C^1$, $C^1$ as shown. D is the central opening between the two parts C, C of the bridge wall, and E is the float ring located at the entrance to said opening D the upper end of said ring projecting above the level of the glass in the compartment A so as to keep back all unmolten metal while the molten portion free from bubbles can pass through the space $c$ which is left between the base of the ring E and the bottom of the tank. The V-shaped construction of each part of the bridge wall, leaves an ample hollow space $C^2$ between the double walls which allows effective cooling of the brick work to be resorted to. $b$, $b$ are additional blocks with inclined sides inserted at the two front corners of the working compartment B, and $b^1$, $b^1$ are the discharge spouts or gathering holes of the said compartment. F is the crown or arch of the furnace and G, G are the port holes by means of which the furnace is heated. The melting compartment A projects beyond the front wall $F^1$ of the furnace so as to leave a charging opening I into which the scrap glass or batch mixture is fed.

In the example shown the furnace is adapted for oil heating, regenerators H, H being provided on each side of the furnace. In the type of furnace shown, the refining or working compartment B is more particularly adapted for automatic machine working, the glass being fed to the machine, or to the auxiliary gathering tanks, as the case may be, through the spouts $b^1$, $b^1$, but any type of working compartment may be used, such for example as those having rounded ends and provided with a series of gathering holes for hand gathering. In other words the working end of the furnace may be designed for any or all purposes.

The new shape or configuration of the tank results in a considerable saving of refractory blocks, while, at the same time the formation of dormant glass in the corners of the tank is eliminated and a more uniform and improved quality of metal is produced. The V-shaped bridge wall also provides large and well-open spaces so that the blocks comprising it are exposed and effective cooling permitted, while the shape of the furnace itself does not result in any sacrifice in the effective melting area of the tank.

What I claim and desire to secure by Letters Patent of the United States is:—

1. A glass melting tank furnace comprising a melting compartment, a working compartment, a bridge wall separating said melting compartment from said working compartment, the sides of said bridge wall being so disposed relatively to both the working and melting compartments as to avoid right angled corners in which dormant glass can collect, and the other boundary walls of said melting compartment being also so formed as to avoid right angled corners.

2. A glass melting tank furnace comprising a melting compartment, a working compartment, a bridge wall separating said working from said melting compartment, the sides of said bridge wall being inclined or curved relatively to both the working and melting compartments, and the other boundary walls of the working and melting compartments being formed with inclined or curved sides for the purpose specified.

3. A glass melting tank furnace comprising a melting compartment, a working compartment, a bridge wall separating said working from said melting compartment, the sides of said bridge wall being inclined or curved relatively to both the working and melting compartments, the other boundary walls of said melting compartments being formed with inclined or curved sides for the purpose specified.

4. A glass melting tank furnace, comprising a melting compartment, a working compartment, a bridge wall separating said working from said melting compartment, the sides of said bridge wall being inclined or curved relatively to both the working and melting compartments, the other boundary walls of the melting compartments being formed with inclined or curved sides and having an end wall which projects beyond the arch of the furnace so as to expose a section into which the batch mixture can be charged.

THOMAS COURTNEY MOORSHEAD.